March 20, 1934.   O. L. LEWIS   1,951,424
SPEED REDUCTION GEAR
Filed Dec. 21, 1932
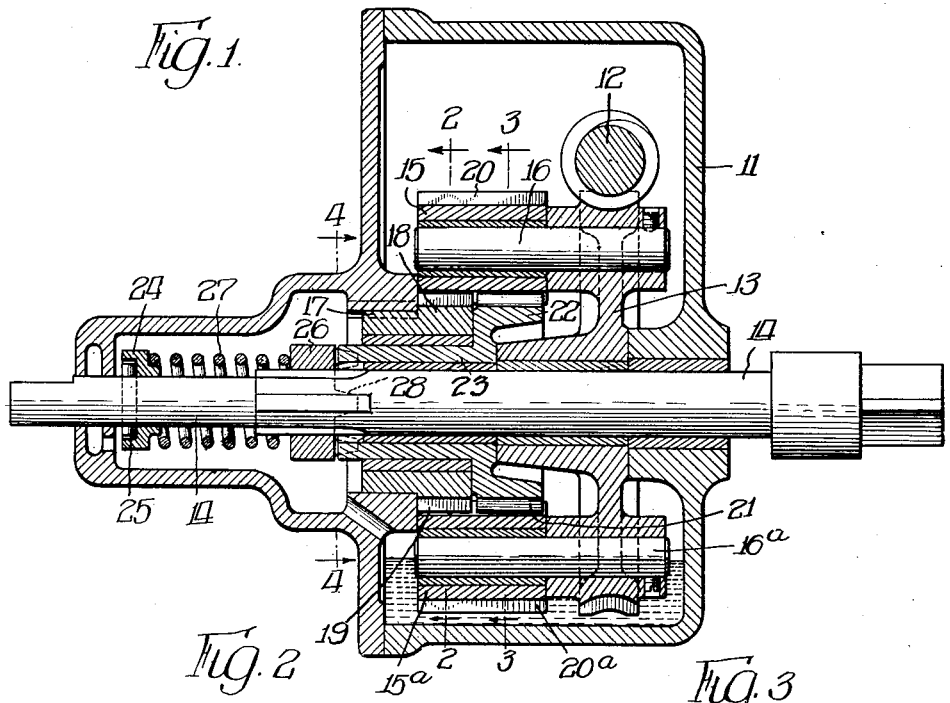
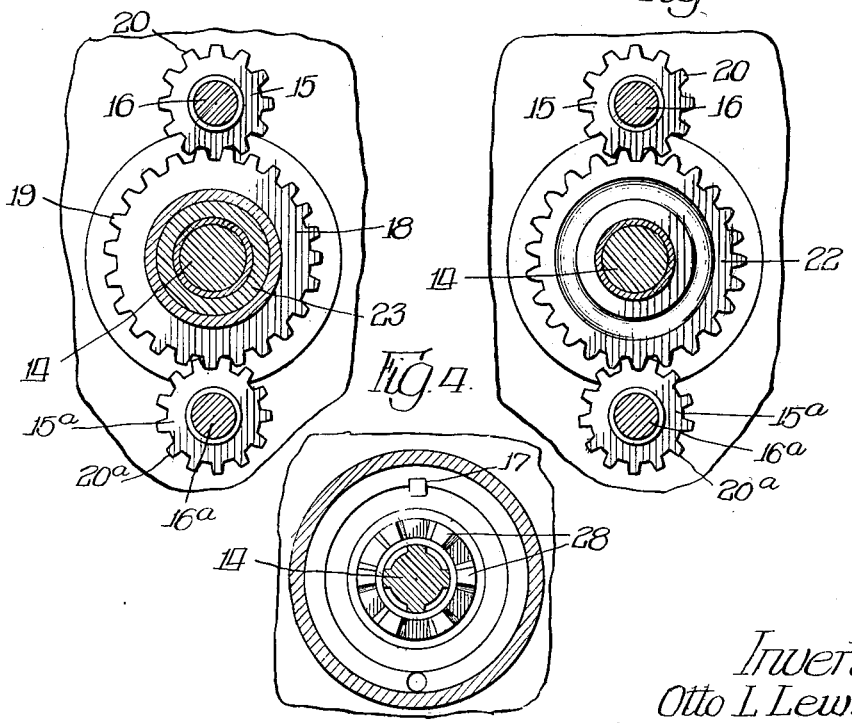
Inventor:
Otto L Lewis,
By Cromwell, Greist & Warden
attys.

Patented Mar. 20, 1934

1,951,424

UNITED STATES PATENT OFFICE 1,951,424

SPEED REDUCTION GEAR

Otto L. Lewis, Chicago, Ill., assignor to Foote Bros. Gear & Machine Co., Chicago, Ill., a corporation of Illinois Application December 21, 1932, Serial No. 648,188

7 Claims. (Cl. 74—34)

This invention has for its object the provision of mechanism whereby to convert the normal speed of a motor drive into greatly reduced speed as transmitted to the driven mechanism of whatsoever character where smooth, accurate and dependable operation is required such, for instance, as a stoker in connection with the driving of which the invention is herein illustrated and described without intent to limit the invention to such application.

Incident to the accomplishment of the foregoing object, provision is made for automatic warning and disconnection of the transmission train in the event of any mishap which might interpose abnormal resistance to the drive and thus cause breakage of the parts, together with instant resumption of normal operation when the cause of stoppage is removed.

To facilitate a clear understanding of the invention and its principle of operation a preferred embodiment of the same is illustrated by way of example in the accompanying drawing wherein Fig. 1 is a longitudinal diametric section through the speed reduction drive and its housing; and Figs. 2, 3 and 4 are transverse sections respectively on the lines 2—2, 3—3 and 4—4 of Fig. 1.

Having reference to the drawing, the reference numeral 11 designates the reduction gear housing into which extends a worm shaft 12 suitably driven by a motor of any type. The worm 12 is in mesh with a worm wheel 13 loosely journaled on a driven shaft 14 which is coupled at its end to the mechanism to be driven at a speed reduced from that of the worm shaft 12. Pinions 15 and 15ª are rotatably mounted upon shafts 16 and 16ª secured in the worm wheel 13 at points concentric to the axis thereof preferably adjacent the periphery of said worm wheel and diametrically opposite each other, said axles projecting laterally to one side of the worm wheel.

Fixedly mounted upon the wall of the casing as indicated at 17 is a circular toothed rack 18 in a position concentric of the driven shaft but spaced therefrom. Teeth 19 of the circular rack are in mesh with the teeth 20 and 20ª of the previously mentioned pinions and upon the rotation of the worm wheel 13 by the worm 12 the pinions are caused to revolve about the circular rack whereby rotation is imparted to the said pinions.

Likewise in mesh with the teeth 20 and 20ª of the first set of pinions 15 and 15ª are the teeth 21 of a second pinion 22 which is journaled upon the driven shaft 14, the nave 23 of the pinion 22 extending about the shaft through the space between the hub portion of the circular rack and the driven shaft.

Upon the driven shaft 14 is fixed a collar 24 by means of a key 25 and opposed thereto upon the driven shaft is splined a sleeve 26 to permit of axial movement of the sleeve upon the shaft. Between the collar 24 and the sleeve 26 is disposed a compression spring 27 whereby the sleeve is yieldingly forced against the end face of the pinion nave 23. The contacting faces of the sleeve and the nave are provided with complementary serrations or teeth 28 having inclined walls; thus constituting a slip clutch connection between the two.

The operation may be briefly described as follows: The angular speed of the worm 12 is greatly reduced in the worm wheel 13; the rotation of the worm wheel is translated into speed of revolution of the pinions 15 and 15ª and a consequent rotation of the pinions as they revolve in mesh with the fixed rack 18. The pinion 22 is preferably of the same diameter as the circular rack 18 and the teeth 21 and 19 mesh side by side with the teeth of the pinions 15 and 15ª. It will be readily understood that if the teeth 19 and 21 respectively of the rack and of the pinion 22 were equal in number, there would be no rotation of the pinion 22 but it would remain stationary. However, said pinion and the circular rack having a slightly unequal number of teeth, the pinion 22 is caused to rotate to the extent of such inequality. It is found most practicable to provide on the pinion 22 two more teeth than are found on the rack 18, wherefore it follows that at each revolution of the pinions 15 and 15ª with the worm wheel 13 the pinion 22 will advance in rotation to the extent of two teeth. To illustrate, if the rack 18 is provided with 24 teeth and the pinion 22 with 26 teeth, the pinion 22 will rotate at a speed equal to 2/26 that of the worm wheel 13.

The provision of an unequal number of teeth on the rack 18 and the pinion 22, both in mesh with the teeth of the one pinion 15, is rendered wholly practicable by adopting for the teeth of the rack 18 or the pinion 22, preferably the former, a taper pyramidal form.

A greater ratio of reduction may be attained by dispensing with the pinion 15ª and its shaft 16ª, thus avoiding the necessity of an aligned relation of its teeth 20ª and the rack teeth and permitting of a difference of but one tooth in the rack 18 and pinion 22. So designed, a reduction of ratio may be attained of 1 to 25 as between the pinions 22 and 15.

The force exerted by the spring 27 is sufficient to maintain the clutch engagement between the sleeve 26 and pinion 22 under normal conditions of operation, but in the event of encountering an obstruction by the driven mechanism resulting in an abnormal resistance to the drive or overload, the spring will permit the clutch serrations to disengage. Warning is instantaneously given of an obstruction by the noise due to the slipping of the clutch; and a cessation of such noise will assure the operator that the obstruction no longer exists and that normal operation has resumed.

It will be appreciated that the invention enables a high degree of speed reduction to be attained by mechanism of exceeding compactness and simplicity. For instance, with a worm wheel having 60 teeth and a difference of one tooth on the circular rack and the pinion 22, the ratio of reduction would be 60/1 × 25/1 or 1500 to 1; while with a difference of two teeth, the ratio of reduction would be 60/1 × 26/2 or 780 to 1.

Efficient lubrication is assured by providing within the bottom of the housing an oil reservoir into which the worm wheel 13 and the revolving pinions 15 and 15$^a$ dip, whereby oil from the reservoir is carried upward and drips back over the gears, working out into the clutch connection whence it drains down the front wall of the pinion nave 23 and finds its way again through the inclined passage to the oil reservoir.

I claim:

1. The combination with a motor drive and a driven shaft, of a speed reduction gear train enclosed within a housing and comprising an externally toothed circular rack fixed within the housing in a position concentric of the driven shaft, a motor driven worm, a worm wheel loosely journaled upon the driven shaft and in mesh with the worm, a pinion in mesh with the rack and rotatably mounted upon an axle projecting laterally from the worm wheel at a point eccentric to its axis whereby the pinion is caused to revolve about the circular rack, a second pinion arranged alongside the circular rack concentric of the driven shaft and rotatable freely thereon, the second pinion having the same diameter as the circular rack and with its teeth in mesh with the teeth of the first pinion, the side face of the second pinion provided with serrations, a collar keyed to the driven shaft, a sleeve splined to the driven shaft to permit of axial movement thereon, said sleeve having on its face serrations complementary to those on the pinion and adapted for slip engagement therewith, and a spring between the collar and sleeve for yieldingly holding the serrations of the sleeve and of the pinion in engagement under normal operation and for permitting disengagement upon overload, the circular rack and the second pinion having an unequal number of teeth.

2. The combination with a motor drive and a driven shaft, of a speed reduction gear train enclosed within a housing and comprising an externally toothed circular rack fixed within the housing in a position concentric of the driven shaft, a motor driven worm, a worm wheel loosely journaled upon the driven shaft and in mesh with the worm, a pinion in mesh with the rack and rotatably mounted upon an axle projecting laterally from the worm wheel at a point adjacent its periphery whereby the pinion is caused to revolve about the circular rack, a second pinion arranged alongside the circular rack concentric of the driven shaft and rotatable freely thereon, the second pinion having the same diameter as the circular rack with its nave extending through the center of the circular rack and with its teeth in mesh with the teeth of the first pinion, the end of the nave provided with serrations, a collar keyed to the driven shaft, a sleeve splined to the driven shaft to permit of axial movement thereon to an extent greater than the depth of the serrations, said sleeve having on its face serrations complementary to those on the pinion nave and adapted for slip engagement and for disengagement therewith, and a spring between the collar and sleeve for yieldingly holding the serrations of the sleeve and of the nave in engagement under normal operation and permitting disengagement upon overload, the circular rack and the second pinion having an unequal number of teeth.

3. The combination with a motor drive and a driven shaft, of a speed reduction gear train enclosed within a housing and comprising an externally toothed circular rack fixed within the housing in a position concentric of the driven shaft, a motor driven worm, a worm wheel loosely journaled upon the driven shaft and in mesh with the worm, a pinion in mesh with the rack and rotatably mounted upon an axle projecting laterally from the worm wheel at a point adjacent its periphery whereby the pinion is caused to revolve about the circular rack, a second pinion arranged alongside the circular rack concentric of the driven shaft and rotatable freely thereon, the second pinion having the same diameter as the circular rack with its nave extending through the center of the circular rack and with its teeth in mesh with the teeth of the first pinion, the end of the nave provided with serrations, a collar keyed to the driven shaft, a sleeve splined to the driven shaft to permit of axial movement thereon to an extent greater than the depth of the serrations, said sleeve having on its face serrations complementary to those on the pinion nave and adapted for slip engagement therewith, and a spring between the collar and sleeve for yieldingly holding the serrations of the sleeve and of the nave in engagement under normal operation and permitting of disengagement upon overload, the circular rack having one less tooth than the second pinion.

4. The combination with a motor drive and a driven shaft, of a speed reduction gear train enclosed within a housing and comprising an externally toothed circular rack fixed within the housing in a position concentric of the driven shaft, a motor driven worm, a worm wheel loosely journaled upon the driven shaft and in mesh with the worm, a wide pinion in mesh over one-half its width with the rack and rotatably mounted upon an axle projecting laterally from the worm wheel at a point adjacent its periphery whereby the pinion is caused to revolve about the circular rack, a second pinion arranged alongside the circular rack concentric of the driven shaft and rotatable freely thereon, the second pinion having the same diameter and substantially the same width as the circular rack and in mesh with the other half of the first pinion with its nave extending through the center of the circular rack, the end of the nave provided with serrations, a collar keyed to the driven shaft, a sleeve splined to the driven shaft to permit of axial movement thereon, said sleeve having on its face serrations complementary to those on the pinion nave and adapted for slip engagement therewith, and a spring disposed between the collar and sleeve for yieldingly holding the serrations of the sleeve and of the nave in engagement under normal operation and permitting disengagement upon overload, the circular rack and the second pinion having an unequal number of teeth; the speed ratio of the worm to the worm wheel being approximately 60 to 1 and the speed ratio of the worm wheel to the second pinion being approximately 25 to 1, whereby is attained a speed reduction of approximately 1500 to 1.

5. The combination with a motor drive and a driven shaft, of a speed reduction gear train enclosed within a housing and comprising an externally toothed circular rack fixed within the housing in a position concentric of the driven shaft, a motor driven worm, a worm wheel loosely journaled upon the driven shaft and in mesh with the worm, a set of wide pinions in mesh over a portion of their width with the rack and rotatably mounted upon axles projecting laterally from the worm wheel at points adjacent its periphery and approximately opposite each other whereby the pinions are caused to revolve about the circular rack, a second pinion arranged alongside the circular rack concentric of the driven shaft and rotatable freely thereon, the second pinion having substantially the same diameter and width as the circular rack and in mesh with the other portion of the first set of pinions with its nave extending through the center of the circular rack, the end of the nave provided with serrations, a collar keyed to the driven shaft, a sleeve splined to the driven shaft to permit of axial movement thereon, said sleeve having on its face serrations complementary to those on the pinion nave and adapted for slip engagement therewith, and a spring disposed between the collar and sleeve for yieldingly holding the serrations of the sleeve and of the nave in engagement, the circular rack and the second pinion having an unequal number of teeth; the speed ratio of the worm to the worm wheel being approximately 60 to 1 and the speed ratio of the worm wheel to the second pinion being approximately 26 to 2, whereby is attained a speed reduction of approximately 780 to 1.

6. The combination with a motor drive and a driven shaft, of a speed reduction gear train enclosed within a housing and comprising an externally toothed annular rack fixed to the side wall of the housing in a position concentric of and interiorly spaced from the driven shaft, a motor driven worm, a worm wheel loosely journaled upon the driven shaft and in mesh with the worm, a pinion in mesh with the rack and rotatably mounted upon an axle projecting laterally from the worm wheel at a point adjacent its periphery whereby the pinion is caused to revolve about the annular rack in mesh with the teeth thereof, a second pinion arranged alongside the annular rack concentric of the driven shaft and rotatable freely thereon, the second pinion having the same diameter and width but more teeth than the annular rack and with its nave disposed within the space between the annular rack and the driven shaft with its teeth in mesh with the teeth of the first pinion, and a slip driving connection between the nave of the second pinion and the driven shaft.

7. The combination with a motor drive and a driven shaft, of a speed reduction gear train enclosed within a housing and comprising an externally toothed annular rack fixed to the side wall of the housing in a position concentric of and interiorly spaced from the driven shaft, a motor driven worm, a worm wheel loosely journaled upon the driven shaft and in mesh with the worm, a pinion in mesh with the rack and rotatably mounted upon an axle projecting laterally from the worm wheel at a point adjacent its periphery whereby the pinion is caused to revolve about the annular rack in mesh with the teeth thereof, a second pinion arranged alongside the annular rack concentric of the driven shaft and rotatable freely thereon, the second pinion having substantially the same diameter as the annular rack but a dissimilar number of teeth and with its nave disposed within the space between the annular rack and the driven shaft with its teeth in mesh with the teeth of the first pinion, and a slip driving connection between the nave of the second pinion and the driven shaft.

OTTO L. LEWIS.